US012401543B2

(12) United States Patent
Miller

(10) Patent No.: US 12,401,543 B2
(45) Date of Patent: Aug. 26, 2025

(54) SHARING SECRETS OVER ONE OR MORE COMPUTER NETWORKS USING PROXIES

(71) Applicant: Garantir LLC, San Diego, CA (US)

(72) Inventor: Kieran Miller, San Diego, CA (US)

(73) Assignee: Garantir LLC, San Diego, CA (US)

( * ) Notice: Subject to any disclaimer, the term of this patent is extended or adjusted under 35 U.S.C. 154(b) by 198 days.

(21) Appl. No.: 18/236,883

(22) Filed: Aug. 22, 2023

(65) Prior Publication Data

US 2024/0223402 A1    Jul. 4, 2024

Related U.S. Application Data

(63) Continuation-in-part of application No. 18/090,742, filed on Dec. 29, 2022, now Pat. No. 11,736,461.

(51) Int. Cl.
*H04L 12/46* (2006.01)
*G06F 21/33* (2013.01)
*H04L 9/40* (2022.01)
*H04L 67/2866* (2022.01)

(52) U.S. Cl.
CPC ...... *H04L 12/4633* (2013.01); *H04L 67/2866* (2013.01)

(58) Field of Classification Search
CPC ............. H04L 12/4633; H04L 67/2866; H04L 63/0807; H04L 63/0884; H04L 63/10; H04L 63/0281; G06F 21/335
See application file for complete search history.

(56) References Cited

U.S. PATENT DOCUMENTS

| | | | |
|---|---|---|---|
| 7,603,700 B2* | 10/2009 | Cheng | H04L 63/08 713/157 |
| 10,305,902 B2* | 5/2019 | Kim | H04L 63/0838 |
| 10,397,189 B1 | 8/2019 | Hashmi | |
| 10,454,917 B2* | 10/2019 | Mavrogiannopoulos | H04L 63/0815 |
| 10,764,752 B1 | 9/2020 | Avetisov et al. | |
| 11,025,483 B1* | 6/2021 | Hashmi | H04L 63/164 |
| 2003/0188193 A1* | 10/2003 | Venkataramappa | H04L 63/0815 726/10 |
| 2005/0120211 A1* | 6/2005 | Yokoyama | G06F 21/335 713/168 |
| 2006/0225132 A1* | 10/2006 | Swift | G06F 21/33 726/11 |
| 2008/0022377 A1 | 1/2008 | Chen et al. | |
| 2010/0142711 A1 | 6/2010 | Weis et al. | |
| 2010/0318799 A1 | 12/2010 | Simon et al. | |
| 2014/0007182 A1 | 1/2014 | Qureshi et al. | |

(Continued)

OTHER PUBLICATIONS

European Patent Office, "Extended European Search Report", in EP application No. EP23220534, dated Feb. 1, 2024, 9 pages.

*Primary Examiner* — Darren B Schwartz
(74) *Attorney, Agent, or Firm* — Hickman Becker Bingham Ledesma LLP

(57) ABSTRACT

Techniques for sharing secrets over one or more computer networks using proxies are provided. In one technique, a proxy server receives, from a client device, over a computer network, a request for a secret. In response to receive the request, the proxy server causes a tunnel to be created with a resource server that is separate from the client device, retrieves the secret from a secrets repository, and causes the secret to be transmitted through the tunnel to the resource server.

19 Claims, 3 Drawing Sheets

(56) References Cited

U.S. PATENT DOCUMENTS

| | | | |
|---|---|---|---|
| 2015/0332029 A1* | 11/2015 | Coxe | G06F 21/31 |
| | | | 726/5 |
| 2016/0142215 A1 | 5/2016 | Kruegel et al. | |
| 2016/0285875 A1 | 9/2016 | Lenz et al. | |
| 2016/0337329 A1 | 11/2016 | Sood et al. | |
| 2017/0171201 A1* | 6/2017 | Matsugashita | H04L 63/20 |
| 2018/0124051 A1* | 5/2018 | Wang | H04L 63/0281 |
| 2018/0351938 A1* | 12/2018 | Vongsouvanh | H04W 12/08 |
| 2019/0268308 A1 | 8/2019 | Sinha et al. | |
| 2020/0067907 A1 | 2/2020 | Avetisov et al. | |
| 2020/0366478 A1 | 11/2020 | Mestery et al. | |
| 2021/0044594 A1 | 2/2021 | Tamura | |
| 2021/0288802 A1* | 9/2021 | Muhanna | H04L 9/3263 |
| 2021/0377254 A1* | 12/2021 | Avetisov | H04L 67/133 |
| 2023/0015882 A1* | 1/2023 | Yokoyama | H04L 67/02 |

\* cited by examiner

SHARING SECRETS OVER ONE OR MORE COMPUTER NETWORKS USING PROXIES

BENEFIT CLAIM

This application claims the benefit as a continuation-in-part of application Ser. No. 18/090,742, filed Dec. 29, 2002, by Kieran Miller, the entire contents of which is hereby incorporated by reference. The applicant hereby rescinds any disclaimer of claim scope in the parent applications or the prosecution history thereof and advise the USPTO that the claims in this application may be broader than any claim in the parent application.

TECHNICAL FIELD

The present disclosure generally relates to secrets management in a computer network and, more particularly, to sharing secrets through proxies.

BACKGROUND

In computer technology, secrets are data items that grant, to clients, access to data or services that the clients request. There are two main types of secrets in computer technology: secrets that are shared with clients and secrets that are not shared with clients. An example of a secret that is not shared with a client is a cryptographic key. Examples of secrets that are shared with clients are passwords, social security numbers (SSNs), credit card numbers, and secrets that are symmetric in nature. Examples of symmetric secrets include AES, HMAC, OTP keys, and API keys for servers.

In the context of secrets that are shared with clients, a client obtains access to a secret which the client passes forward to another endpoint for validation. A problem with this approach is that once a client obtains access to a secret, the client can do anything with that secret, such as making copies of the secret or transmitting the secret to one or more untrusted parties. Thus, in the secret sharing approach, the client is inherently being trusted the client's environment is being trusted as secure. This trust is, in many cases, an unwarranted one. If a client is compromised, then any secrets that the client has received may be obtained by an unscrupulous actor, such as a hacker, who may use the secrets to obtain data and/or services that were previously only accessible to the client.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system for sharing secrets through one or more proxies are provided. Though a client has right to use a secret, the client is not allowed to see or have the secret. In one technique, a secrets manager creates a tunnel with a resource server, which grants or denies access to clients seeking access to resources, such as data or services. The secrets manager transmits, through the tunnel, a secret pertaining to a client. In this way, the secrets manager acts as a secrets proxy.

In another technique, a secrets manager creates a tunnel, transmits a secret on behalf of a client to a resource server, and then transfers the tunnel session data to the client. In a related technique, the secrets manager performs a rekeying operation before transmitting the tunnel session data to the client. However, the client keeps the same tunnel session with the resource server.

In another technique, an entity other than a secrets manager acts as a proxy and is allowed to export secrets instead of the secrets manager.

In another technique, the proxy is a secure enclave executing on a client and the proxy communicates with a resource server. In this technique, a secret from a secrets manager is encrypted and sent to the secure enclave, which decrypts the secret and then proxies the request, via a secure tunnel, to the resource server through the client. The communication between the client and the resource server is encrypted and the client is unable to see the communicated data. The secure enclave is effectively part of the tunnel. In a related technique, the enclave performs a rekeying operation and then passes the tunnel session data to the client, which is able to perform operations faster without having to interact with the secure enclave.

Embodiments improve computer-related technology by improving the security of sharing secrets among different computer systems. This technical improvement involves preventing a requesting client from accessing a secret. Instead, a secrets manager or another proxy transmits a secret on behalf of the requesting client and may do so in a secure manner.

System Overview

Figure 1:
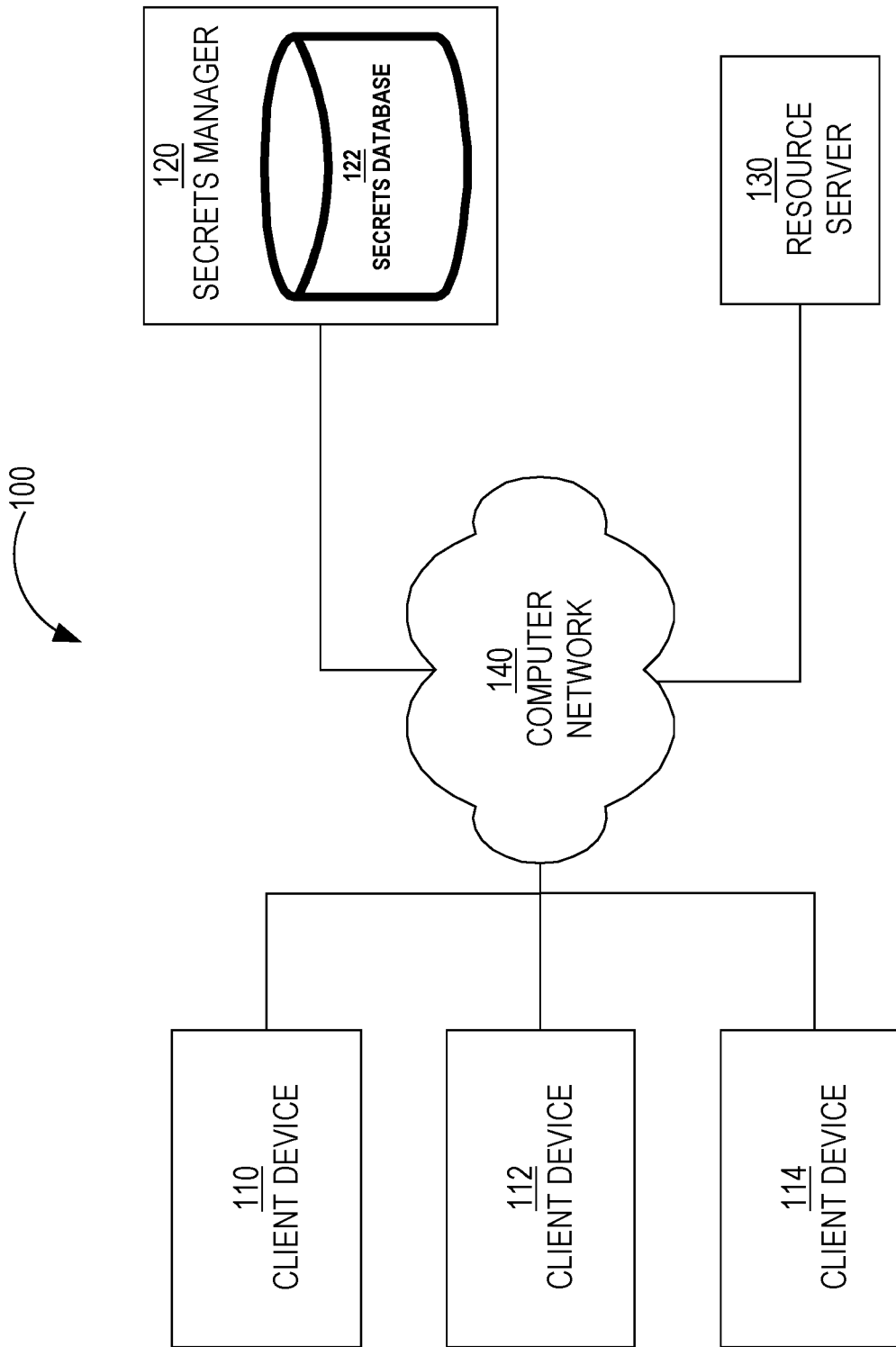
FIG. 1 is a block diagram that depicts an example system for managing secrets, in an embodiment.

FIG. 1 is a block diagram that depicts an example system 100 for managing secrets, in an embodiment. System 100 includes client devices 110-114, a secrets manager 120, a resource server 130, and a computer network 140. Although three client devices are depicted, system 100 may include fewer or more than three client devices. Also, system 100 may include additional resource servers that are communicatively coupled to secrets manager 120.

Client devices 110-114 are communicatively coupled to secrets manager 120 over computer network 140, such as a LAN, WAN, or the Internet. Similarly, secrets manager 120 is communicatively coupled to resource server 130 over computer network 140 or over a separate computer network, such as another LAN or WAN.

Each of client devices 110-114 executes an application that is configured to send a request to secrets manager 130 for a secret that is to be transmitted to resource server 130. The application may be a native application that is installed on the client device or may be a web application that executes within a web browser that is installed on the client device. Examples of client devices 110-114 include laptops, desktop computers, smartphones, wearable devices (e.g., smartwatches), game consoles, etc.

Secrets manager 120 includes a secrets repository 122 that stores multiple secrets. Each secret stored in secrets repository 122 is stored as part of a tuple that associates the secret with zero or more users or clients, and, optionally, a resource server, if there are multiple resource servers with which secrets manager 120 interacts. Thus, a given secret is either accessible by multiple users, by only a single user, or by no user. A tuple may comprise a device identifier (e.g., an IP address of the client device or a MAC address of the client device), a unique user identifier (e.g., that is generated by an identity provider (not depicted), secrets manager 120, or resource server 130), one or more secrets (each of which may or may not be encrypted), and/or a resource server identifier (e.g., an IP address or hostname of resource server 130).

Client device 110 generates and transmits, to secrets manager 120, a request for one or more secrets, where the request may include data, such as a device ID of client device 110, a user ID of a user of client device 110, and/or an identifier of resource server 130. Client device 110 uses one or more techniques to communicate with secrets manager 120. One example technique is using a RESTful API, which is an application programming interface that uses HTTP requests to GET, PUT, POST, and DELETE data. A RESTful API is based on representational state transfer (REST) technology, which is an architectural style and approach to communications used in web services development.

In response to receiving a request from client device 110, secrets manager 120 identifies one or more secrets in secrets repository 122 based on one or more data items in the request, such as a device identifier, user identifier, and/or a resource server identifier. Instead of sending the identified one or more secrets to client device 110, secrets manager 120 sends the one or more secrets to resource server 130 on behalf of client device 110 (or to another computing entity that sends the one or more secrets to resource server 130 on behalf of client device 110), as described in more detail herein.

Although depicted as separate from client device 110, secrets manager 120 may reside in a secure enclave of client device 110.

Resource Server

Resource server 130 manages access to resources that are stored by or "behind" resource server 130. Resource server 130 grants resource requests to authenticated and authorized users who authenticate via the appropriate secrets. Thus, resource server 130 responds to requests for those resources after requestors are authenticated based on secrets. Resource server 130 initiates a challenge-response handshake in response to receiving, from client device 110 (and other client devices), a request for a resource. The challenge is provided by resource server 130 to client device 110 and client device 110 needs to provide the correct response in order to be authenticated to resource server 130.

Resource server 130 may implement one or more challenge-response-based protocols. In some such protocols, the challenge is explicit, such as a hash value that client device 110 needs to cryptographically process (e.g., decrypt or digitally sign) with an appropriate cryptographic key. In another such protocol, the challenge is implicit, such as through TOTP (time-based one-time password). According to this algorithm, the authenticatee and authenticator pre-establish both HOTP (HMAC-based one-time password) parameters and the following TOTP parameters: (1) $T_0$, the Unix time from which to start counting time steps (default is 0); and (2) $T_X$, an interval which will be used to calculate the value of the counter $C_T$ (default is 30 seconds). Both the authenticator and the authenticatee compute the TOTP value, then the authenticator checks if the TOTP value supplied by the authenticatee matches the locally generated TOTP value.

Resource server 130 may be communicatively connected to one or more databases, one or more file systems, and/or one or more cloud services. Also, resource server 130 may host one or more online services and/or is connected to one or more computing devices that hosts one or more online services. Examples of privileged resources include data, applications, and online services. An example of a resource server is a privileged server, which serves only privileged users, who are typically considered to be system administrators.

Resource server 130 may be hosted "on premise" of an enterprise that owns the data protected by the resource server 130. That is, one or more instances of resource server 130 execute on one or more computing devices that are also owned by the enterprise. Alternatively, resource server 130 may be hosted by cloud hosting service, which owns the computing devices that execute one or more instances of resource server 130.

Resource server 130 might not be aware of secrets manager 120. Resource server 130 primarily knows that client device 110 must use a secret to authenticate itself. Whether client device 110 uses a secrets manager or not is not relevant to resource server 130.

Process Overview

Figure 2:
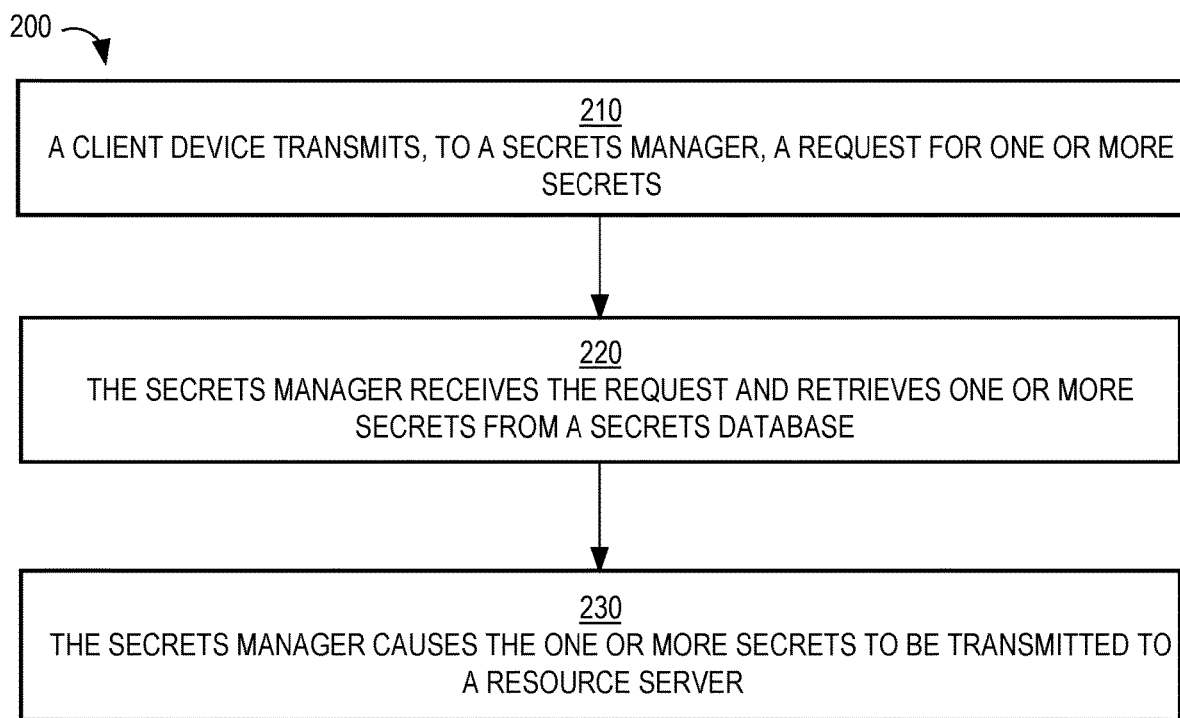
FIG. 2 is a flow diagram that depicts an example process for securely sharing secrets, in an embodiment.

FIG. 2 is a flow diagram that depicts an example process 200 for securely sharing secrets, in an embodiment.

At block 210, a client device transmits, to a secrets manager, a request for one or more secrets. Block 210 may be performed in response to user input that indicates selection, or a retrieval request, of one or more online or digital resources from a resource server. The request may be generated in response to the client device receiving the user input. The request may include an identifier of the resource server and an identifier of one or more resources that are accessible through the resource server.

At block 220, a secrets manager receives the request and retrieves one or more secrets based on the request. Block 220 may involve the secrets manager performing a lookup in a secrets repository based on a device ID, user ID, and/or resource server ID in the request. A lookup may result in zero or more secrets, depending on whether a secret is associated with all (or at least a portion) of the search criteria. In some cases, the resource server is not aware of the secrets manager. Though the resource server "knows" that the client device must use a secret in order to authenticate, whether the client device uses a secret manager is not relevant to the resource server.

At block 230, the secrets manager causes the one or more secrets to be transmitted to a resource server. The identity of the resource server may have been included (a) in the request from the client device (which request may include data in the original request from the client device, such as one or more resource identifiers of resources that the client device is requesting) or (b) with the retrieved one or more secrets from the secrets repository. As described in more detail herein, how the one or more secrets are transmitted to the resource server may be performed in one or more ways. For example, the secrets manager may send the one or more secrets directly (e.g., over the Internet) to the resource server or may send the one or more secrets to another computing device with instructions for the other computing device to forward the one or more secrets to the resource server. Also, any transmission by the secrets manager may utilize one or more secure communication channels that involves encrypting the one or more secrets, as described in more detail herein.

The resource server returns the one or more resources that the client device requested, presuming that the secret that originated at the secrets manager is valid for the client device.

Tunnel-Based Techniques

There are multiple techniques that allow for a client device to use a secret (e.g., a SSN or a password) without having access to the secret. One technique is referred to as the tunnel-based technique. In this technique, secrets manager 120 creates a tunnel to resource server 130 and sends a secret (that is associated with a client device, such as client device 110) through the tunnel to resource server 130. An example of a tunnel is a Transport Layer Security (TLS) tunnel. TLS is a cryptographic protocol that is designed to provide communications security over a computer network. The protocol is widely used in applications such as email, instant messaging, and voice over IP, but its use in securing HTTPS remains the most publicly visible.

Once a client and a server have agreed to use TLS, they negotiate a stateful connection by using a handshaking procedure. The protocols use a handshake with an asymmetric cipher to establish not only cipher settings but also a session-specific shared key with which further communication is encrypted using a symmetric cipher. During this handshake, the client and the server agree on various parameters used to establish the connection's security. The handshake begins when a client connects to a TLS-enabled server requesting a secure connection and the client presents a list of supported cipher suites (ciphers and hash functions). From this list, the server selects a cipher and hash function that it also supports and notifies the client of the decision. The server usually then provides identification in the form of a digital certificate. The certificate contains the server name, the trusted certificate authority (CA) that vouches for the authenticity of the certificate, and the server's public encryption key. The client confirms the validity of the certificate before proceeding. To generate the session keys used for the secure connection, the client either (a) encrypts a random number (PreMasterSecret) with the server's public key and sends the result to the server (which only the server should be able to decrypt with its private key); both parties then use the random number to generate a unique session key for subsequent encryption and decryption of data during the session; or (b) uses Diffie-Hellman key exchange to securely generate a random and unique session key for encryption and decryption that has the additional property of forward secrecy: if the server's private key is disclosed in future, it cannot be used to decrypt the current session, even if the session is intercepted and recorded by a third party.

This concludes the handshake and begins the secured connection, which is encrypted and decrypted with the session key until the connection closes. If any one of the above steps fails, then the TLS handshake fails and the connection is not created.

In an embodiment, in response to receiving a request for a secret to be transmitted to resource server 130, secrets manager 120 creates a tunnel with resource server 130, identifies a secret (from secrets repository 122) associated with the client device that transmitted the request, and sends, over (or through) the tunnel, to resource server 130, the secret and client identification data that identifies the client device. Subsequent communications between resource server 130 and the client device go through secrets manager 120 and the tunnel. Examples of such subsequent communications depend on the context. For example, if a secret is a password in order to access an online account via a website and the website (or resource server 130) provides financial services, subsequent communications may involve initiating one or more financial transactions. If the website is an online photo management website, then the subsequent communications may be requesting and transmitting digital photos.

In a related embodiment, instead of communications between client device 110 and resource server 130 going through secrets manager 120 and the tunnel, secrets manager 120 transfers the tunnel session data to client device 110 after secrets manager 120 has transmitted the secret to resource server 130. In this way, subsequent communications between client device 110 and resource server 130 do not have to go through an intermediary. This reduces the roundtrip time of such communications.

In the above technique, even after transferring the tunnel data to client device 110, client device 110 is able to obtain the secret that secrets manager 120 passed to resource server 130. Thus, in a related embodiment, secrets manager 120 performs a (e.g., TLS) rekeying operation before transferring the tunnel data to client device 110. A rekeying operation means that a new key is used to encrypt data that is transferred between two entities. Thus, one key is used to encrypt the secret (and the encrypted key is sent to resource server 130) and another key is used to encrypt subsequent data that is transmitted between client device 110 and resource server 130. Nevertheless, client device 110 keeps the same session with resource server 130, such as keeping the same session identifier and one or more other metadata items. In this way, client device 110 is unable to obtain the secret after the tunnel data is passed to client device 110.

Non-Secrets Manager Proxy

In the above technique, secrets manager 120 acts as a proxy that exports secrets to resource server 130. In an embodiment, a computing device or component that is separate from secrets manager 120 transmits a secret to resource server 130 on behalf of client device 110. Thus, client device 110 submits a request for a secret to secrets manager 120. In response to the request, secrets manager 120 retrieves a secret that is associated with the client device 110 and transmits a forwarding request (that includes the secret, or an encrypted version thereof) to a proxy that is separate from secrets manager 120. The forwarding request may include a destination identifier (e.g., a destination IP address) that identifies resource server 130. The forwarding request may also include instructions to the proxy on how the proxy is to process the secret and/or where to send the secret. For example, an instruction may be for the proxy to encrypt the secret with a particular key prior to transmitting the encrypted secret to resource server 130. As another example, an instruction may be to create a secure tunnel with resource server 130.

The proxy may execute on a computer system that is separate (or even remote) from a computer system that hosts secrets manager 120. For example, in order to communicate with the proxy, secrets manager 120 generates and transmits, over the Internet, an HTTP request to the proxy. Alternatively, the proxy may execute on the same computer system that hosts secrets manager 120. Wherever the proxy resides, this proxy technique reduces the burden on secrets manager 120 to interact with resource server 130.

In a related embodiment of this proxy embodiment, the proxy creates a tunnel with resource server 130, similar to the technique described herein where secrets manager 120 creates a tunnel with resource server 130. The tunnel may be maintained so that any subsequent communications from client device 110 and resource server 130 go through the proxy.

In a related embodiment to the tunnel-based proxy embodiment, after the proxy sends one or more secrets to resource server 130 on behalf of secrets manager 120 (and client device 110), the proxy performs a rekeying operation with resource server 130 and sends updated tunnel data to client device 110 so that subsequent communications between client device 110 and resource server 130 do not have to go through an intermediary, which can increase latency of such communications.

Token Approach

In an embodiment, client device 110 sends a request for a token to secrets manager 120. This request may include a client device ID, a user ID, and/or a resource server ID. Secrets manager 120 uses one or more of these IDs to retrieve/generate a token. The token is associated with one or more secrets that are associated with client device 110. The token may be generated periodically or in response to the request from client device 110. A token may have a life span where it can only be used to obtain a corresponding secret within a certain time period from the token's creation. After expiration of a token, an entity requesting the corresponding secret will be denied the secret and, therefore, not receive the secret. Once a valid token is identified, secrets manager 120 responds to the request (from client device 110) by transmitting (to client device 110) a response that includes the token.

Once client device 110 receives the token, client device 110 sends a request to a proxy that is separate from secrets manager 120. The request may include one or more resource identifiers of resources that are managed by (or "behind") resource server 130. The proxy determines, based on the request and/or contents of the request (such as the existence of a token in the request), that a de-tokenization operation is requested. The proxy initiates the de-tokenization operation by sending the token to secrets manager 120, which uses the token to lookup a corresponding secret, such as in a secrets repository or database. For example, secrets manager 120 may maintain, in a secrets repository, a mapping of tokens and their corresponding secrets and, optionally, expiration information for each token-secret association in the mapping. Secrets manager 120 returns a secret that corresponds to the token received from the proxy. The proxy inserts the secret into the request from client device 110 and sends the updated request to resource server 130. As described herein, this communication may occur in the context of a tunnel between the proxy and resource server 130.

Secure Enclave Approach

In an embodiment, instead of a proxy that is separate from client device 110 sending a secret to resource server 130 on behalf of client device 110, a secure enclave that is hosted on client device 110 acts as the proxy and, therefore, communicates with resource server 130.

A secure enclave is a secure coprocessor that includes a hardware-based key manager that is isolated from the main processor (e.g., of client device 110) to provide an extra layer of security. A secure enclave provides CPU hardware-level isolation and memory encryption by isolating application code and data from anyone with privileges and encrypting its memory. With additional software, secure enclaves enable the encryption of both storage and network data for full stack security. Hardware support for a secure enclave may be built into a CPU when the CPU is manufactured. A secure enclave is a physical, tamper-resistant area that has its own code base that knows to verify a digital signature. A secure enclave may reside on cryptographic device 140 or on a computing device that hosts proxy server 130. Secure enclaves are sometimes referred to as "trusted execution engines" or TEEs. A secure enclave may or may not have network access for transmitting data requests to remote devices (i.e., over a network).

One way to prove that a secure enclave is an entity that resource server 130 can trust is via attestation. One method of attestation is storing a hash of executable code that is running in the secure enclave. Resource server 130 can validate the hash and, as a result, can trust that the secure enclave performed signature validation and, therefore, resource server 130 will perform a requested operation.

In the embodiment where a secure enclave on client device 110 acts as a proxy, client device 110 sends, to secrets manager 120, a secrets request for one or more secrets that are associated with client device 110. The secrets request may originate from the secure enclave or from client device 110, which then communicates with the secure enclave, which then communicates with secrets manager 120. In response, secrets manager 120 retrieves one or more secrets (which secrets manager 120 may encrypt in response to the secrets request) from secrets repository 122 and sends the one or more (possibly encrypted) secrets to the secure enclave. This traffic may pass through client device 110, which will not be able to read the traffic because the traffic is end-to-end encrypted between the secure enclave and secrets manager 120. The secure enclave decrypts the one or more encrypted secrets using a key (e.g., a symmetric key or a private key in a public-private key pair). The secure enclave then establishes a tunnel with resource server 130 and proxies a request to resource server 130 through client device 110. Thus, communications between the secure enclave and resource server 130 are encrypted and, therefore, client device 110 is unable to access the plaintext.

In a related embodiment, the secure enclave, after transmitting one or more secrets to resource server 130 on behalf of client device 110, performs a rekeying operation with resource server 130 and passes tunnel session data to client device 110, which can communicate directly with resource server 130 faster than having to go through the secure enclave.

Policy-Based Secrets

In an embodiment, a policy is bound (or attached) to a secret. A policy may be stored in a policy repository that is maintained by secrets manager 120 or may reside on client device 110. Alternatively, the policy repository may be maintained by a separate policy server (not depicted). Thus, either of these three entities may apply a policy. A policy (a) defines a set of one or more restrictions with respect to a secret and/or (b) may be associated with one or more resource servers. For example, a policy for a particular secret indicates to which resource server (among multiple resource servers) the particular secret applies. In order words, a policy may indicate where a particular secret may be sent. If client device 110 or a proxy determines, based on a policy of a secret, that the secret cannot be sent to resource server 130, then the secret is not sent to resource server 130. Examples of restrictions of a secret include a number of times the secret may be used or transmitted to a resource server, a time of day in which the secret may be used or transmitted to a resource server, a geographical location in which the secret may be used, previous transactions pertaining to the secret, a risk level of the secret (which risk level may change from time to time), a risk level of a system that manages the secret (which risk level may change from time to time), approval workflows (i.e., where one or more individuals must approve the user of the secret), multi-factor authentication, and device authentication.

Whichever entity that is communicating with secrets manager 120 may enforce a policy. Thus, client device 110 may enforce a policy, a proxy (whether remote or local to client device 110) may enforce the policy, or a separate policy server may enforce the policy.

A policy may also identify one or more authentication checks before a secret may be sent to a resource server. Such authentication checks may be enforced by client device 110 or a proxy, if one exists. For example, a policy may require: a user to enter a personal identification number (PIN); a biometric check (e.g., an iris scan, voice verification); OATH/OTP (or one-time password); CAPTCHA; and/or FIDO2, which is a new standard for authentication that uses public key cryptography in an effort to go password-less. FIDO2 generates a digital signature in a secure enclave on a user's device.

In an embodiment, a restriction is dynamic in nature. For example, a client device or proxy programmatically communicates with a policy server that states whether a secret can be used for a given request.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
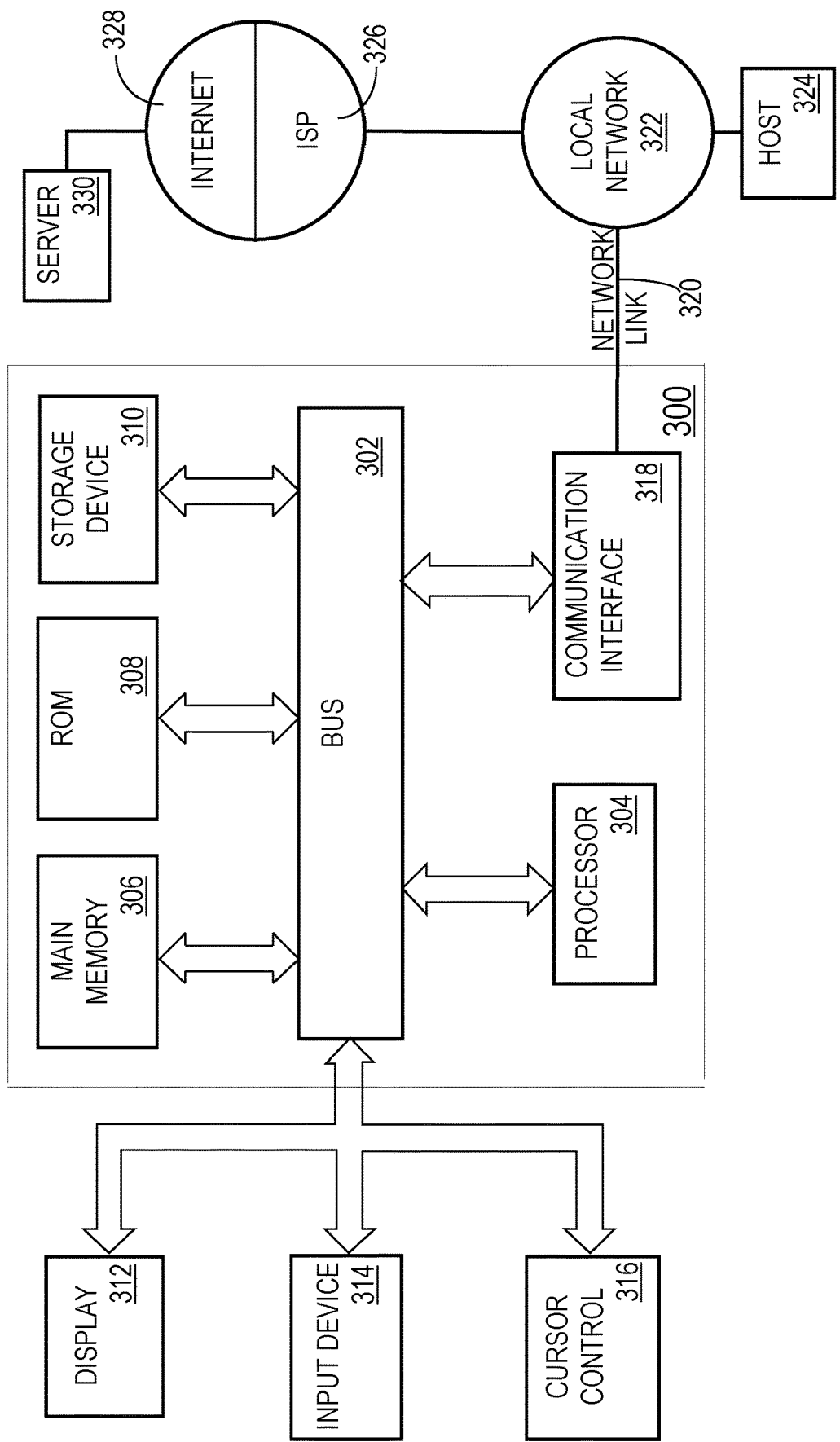
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, from a client device, at a proxy server, a request for a secret, wherein the request includes a token;
in response to receiving the request, the proxy server:
causing a tunnel to be created with a resource server that is separate from the client device;
retrieving the secret that is stored in a secrets repository, wherein retrieving the secret comprises sending the token to a secrets manager that retrieves the secret from the secrets repository based on the token;
wherein an association between the secret and the token is associated with expiration information;
causing the secret to be transmitted through the tunnel to the resource server;
wherein the method is performed by one or more computing devices.

2. The method of claim 1, wherein the client device receives the token from the secrets manager prior to transmitting the request to the proxy server.

3. The method of claim 1, wherein the request includes a resource identifier, wherein causing the secret to be transmitted comprises causing the resource identifier to be transmitted with the secret to the resource server.

4. The method of claim 3, further comprising:
after causing the secret to be transmitted to the resource server, receiving, by the proxy server, a response that includes a resource that is identified by the resource identifier;
forwarding the resource to the client device.

5. The method of claim 1, wherein the client device does not have access to the secret in plaintext format.

6. The method of claim 1, further comprising:
after transmitting the secret through the tunnel to the resource server, sending, to the client device, tunnel data about the tunnel to allow the client device to communicate with the resource server through a second tunnel that is based on the tunnel data.

7. The method of claim 6, further comprising, prior to sending the tunnel data to the client device:
performing a rekeying operation with the resource server, wherein the rekeying operation updates a portion of the tunnel data;
wherein sending the tunnel data to the client device comprises sending the portion, of the tunnel data, that was updated.

8. The method of claim 7, wherein:
the portion is a first portion;
the rekeying operation does not update a second portion, of the tunnel data, that is different than the first portion;
sending the tunnel data to the client device comprises sending the second portion.

9. The method of claim 1, wherein:
causing the tunnel to be created comprises causing the tunnel to be created on a first computing device that is separate from a second computing device that hosts a secrets manager that manages a plurality of secrets that includes the secret;
causing the secret to be transmitted through the tunnel to the resource server comprises sending the secret to the first computing device.

10. The method of claim 1, wherein:
causing the tunnel to be created comprises causing the tunnel to be created in a secure enclave that is hosted on the client device;
causing the secret to be transmitted through the tunnel to the resource server comprises sending the secret to be sent to the secure enclave, which forwards the secret to the resource server.

11. The method of claim 10, wherein the tunnel is a first tunnel, the method further comprising:
after transmitting the secret through the first tunnel to the resource server, sending, by the secure enclave to the client device, tunnel data about the first tunnel to allow the client device to communicate with the resource server through a second tunnel that is based on the tunnel data and that is different than the first tunnel.

12. The method of claim 11, wherein the secret is associated with a policy that defines one or more restrictions with respect to the secret.

13. The method of claim 12, wherein the one or more restrictions include a number of times the secret may be used or transmitted to the resource server, a time of day in which the secret may be used or transmitted to the resource server, or a geographical location in which the secret may be used.

14. The method of claim 12, further comprising:
receiving, from a policy server, an indication whether the policy allows the secret to be transmitted through the tunnel to the resource server.

15. The method of claim 12, wherein the policy is associated with one or more authentication checks that must pass before the secret is sent to the resource server.

16. The method of claim 15, wherein the one or more authentication checks include a personal identification number (PIN), a biometric check, a one-time password, a CAPTCHA; or FIDO2.

17. One or more non-transitory storage media storing instructions which, when executed by one or more computing devices, cause:
receiving, from a client device, over a computer network, a request for a secret, wherein the request includes a resource identifier and a token;
in response to receiving the request:
causing a tunnel to be created with a resource server that is separate from the client device;
retrieving the secret that is stored in a secrets repository, wherein retrieving the secret comprises sending the token to a secrets manager that retrieves the secret from the secrets repository based on the token;
wherein an association between the secret and the token is associated with expiration information;
causing the secret and the resource identifier to be transmitted through the tunnel to the resource server.

18. The one or more storage media of claim 17, wherein the instructions, when executed by the one or more processors, further cause:
after transmitting the secret through the tunnel to the resource server, sending, to the client device, tunnel data about the tunnel to allow the client device to communicate with the resource server through a second tunnel that is based on the tunnel data.

19. The one or more storage media of claim 18, wherein the instructions, when executed by the one or more processors, further cause, prior to sending the tunnel data to the client device:
performing a rekeying operation with the resource server, wherein the rekeying operation updates a portion of the tunnel data;
wherein sending the tunnel data to the client device comprises sending the portion, of the tunnel data, that was updated.

* * * * *